Sept. 5, 1967   W. A. TENKKU ET AL   3,339,586
MOTOR CONTROLLED SEQUENTIALLY OPERATED PLURAL VALVES
Filed May 27, 1964
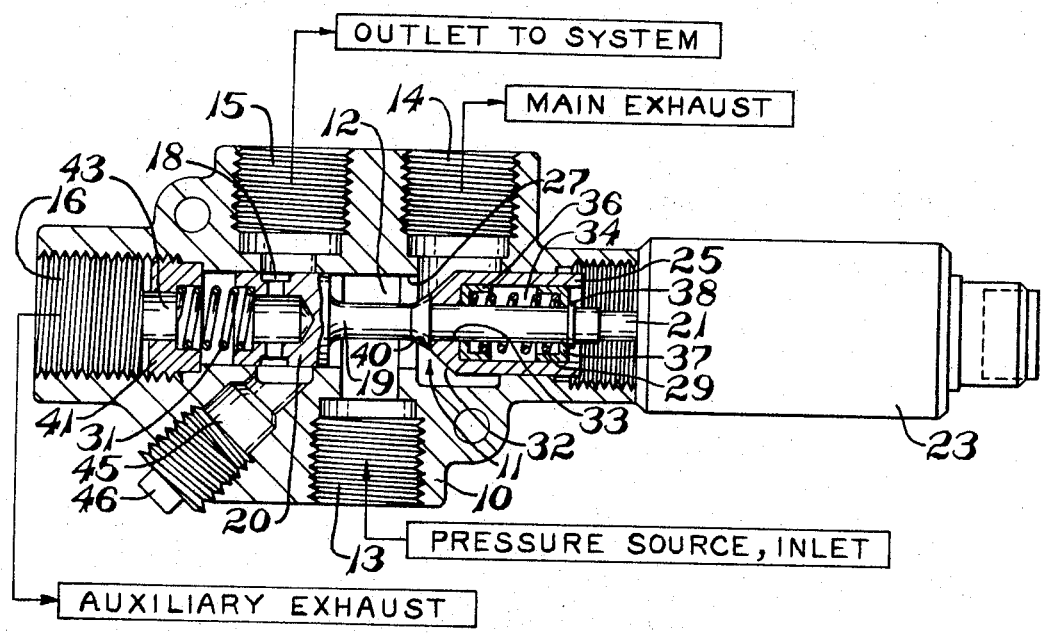
INVENTORS
FRANK HRIBAR, JR.
BY WAYLAND A. TENKKU
John D. Haney
ATTY.

United States Patent Office 3,339,586
Patented Sept. 5, 1967

3,339,586
MOTOR CONTROLLED SEQUENTIALLY OPERATED PLURAL VALVES
Wayland A. Tenkku, Mentor, and Frank Hribar, Jr., Kirtland, Ohio, assignors to Fluid Regulators Corporation, Painesville, Ohio, a corporation of Ohio
Filed May 27, 1964, Ser. No. 370,469
2 Claims. (Cl. 137—628)

This invention relates to valves and more particularly to a combination directional control and pressure regulating valve. The valve of this invention is especially suitable for aircraft service in pneumatic ice-removal equipment.

The valve of this invention provides for directional control of a fluid pressure medium in response to the operation of an independently actuated motor, preferably an electric motor such as a solenoid. The directional control member of the valve, a plunger, is normally open between a pressure supply inlet port and a main exhaust port, and operates to block the flow of the system fluid through these ports when the motor is energized. Additionally the valve plunger is normally open between its outlet port communicating with equipment (i.e. inflatable ice-removal tubes) and an auxiliary exhaust port separate from the main exhaust port. In the energized condition the inlet port is communicated to the outlet port, and both exhaust ports are blocked by the plunger. The valve is particularly characterized in that the directional control member or plunger is yieldingly connected to the actuating motor so that the plunger also functions automatically to modulate the system pressure.

The invention will be further described with reference to the accompanying drawing shows, by way of example, a valve made according to and embodying this invention. The valve is described with particular reference to its use in a pneumatic ice-removal system for aircraft and, in the drawing, the valve is shown in axial cross section in its normal or de-energized condition.

The valve includes a plunger assembly 11 that is adapted to reciprocate within an axial bore 12 of casing 10. During the normal or de-energized condition of the valve (the portion of the valve represented in the drawing), a fluid pressure medium at inlet port 13 is communicated to main exhaust port 14, the valve being normally open between these ports. Additionally, an outlet port 15 is communicated with auxiliary exhaust port 16 through a radial port 18 of a plunger head 20. Accordingly, the valve is also normally open between ports 15 and 16 providing a means for venting any operational system connected at outlet port 15.

The valve is actuated by the leftward movement of armature 21 of solenoid 23 which provides in this example the motive power to operate the valve. Armature 21 abuts a plunger rod 19 of the plunger assembly 11 which correspondingly moves leftward carrying with it a poppet sleeve 25 adapted to seat in an orifice 27 to block communication between inlet port 13 and main exhaust port 14. Plunger rod 19 is integral with plunger head 20 so that the latter is movable by rod 19 to a position in which radial ports 18 in plunger head 20 are blocked by casing 10 to close communication between the outlet port 15 and auxiliary exhaust port 16. In the latter position of the plunger head 20 the inlet 13 is communicated directly to outlet port 15. A spring 29 inside poppet sleeve 25 holds said sleeve seated in orifice 27 when the valve is energized, but permits relative movement of the sleeve 25 on the plunger rod 19 against the spring 29 to open the orifice 27.

The plunger head 20 and plunger rod 19 are biased rightward by a spring 31 to maintain the right end of the plunger rod 19 in abutting engagement with armature 21.

Poppet sleeve 25 is concentric with rod 19 and is slidable axially in casing 10. Sleeve 25 has a beveled face 32 to seat in orifice 27. The sleeve has a bore 33 leading from face 32 into the central chamber 34 of the sleeve 25. Within chamber 34, spring 29 is caged under compression between a cup washer 36 which seats against the bottom of chamber 34 and another cup washer 37 near the mouth of chamber 34. The latter washer is in slidable engagement with the interior wall of chamber 34 and is retained inside the sleeve 25 by an annular snap ring 38. The spring 29 normally urges the sleeve 25 to a position on rod 19 in which the left end of the sleeve is engaged with a beveled shoulder 40 which is integral with plunger rod 19. The sleeve 25 is slidable rightward relative to rod 19 away from shoulder 40 against the resistance of spring 29.

The plunger head 20 is a hollow cylindrical member which is slidable in the region of casing 10 near outlet port 15. The head 20 has radial ports 18 for communicating outlet port 15 with auxiliary exhaust 16 during the inactive condition of the valve.

Spring 31 which biases the plunger assembly 11 is retained in the casing by an annular plug 41 threaded into port 16. The center opening 43 of plug 41 provides communication between port 16 and ports 18 and 15. The opposite end of spring 31 bears against plunger head 20.

A test port 45, sealed by plug 46, is provided in casing 10 provide access for measurement of conditions within the operational system.

Ice-removal from airfoils is effected by alternately inflating and deflating pneumatic tubes mounted along such airfoils thereby shattering any film of ice forming on such airfoil.

When using this valve in such aircraft ice-removal equipment, the inlet port 13 is connected to a source of fluid pressure, such as the pressure outlet connection of an engine-driven pump or the like (not shown). Main exhaust port 14 is connected to an overboard vent (not shown) through which the system fluid, viz. air may be exhausted to the surroundings. Auxiliary exhaust port 16 also is connected to an overboard vent (not shown) through which the system fluid, viz. air may be exhausted to the surroundings. The outlet port 15 is communicated to the inflatable ice-removal tubes.

During the deflation phase of the operating cycle of the equipment, the valve of this invention is normally open in the condition shown in the drawing so that the pressure source at inlet port 13 is vented through the valve directly to the main exhaust port 14. The inflatable tubes are vented to the auxiliary exhaust port 16 through outlet port 15.

To begin the inflating phase of the operating cycle, the solenoid 23 is operated to shift the plunger 19 leftward to close the poppet sleeve 25 tightly on its seat at orifice 27. This action directs the fluid pressure medium from inlet port 13 through outlet port 15 into the ice-removal tubes to inflate them.

As the plunger rod 19 is forcefully displaced leftward, the snap ring 38, on rod 19 displaces cup washer 37 leftward to exert an axial compressive force on spring 29. The spring 29 in turn transmits the force and motion of the pluger rod 19 to the poppet sleeve 25, to displace the sleeve 25 until its face 32 is tightly seated against orifice 27. Concurrently the leftward motion of the plunger head 20 compresses the plunger retraction spring 31.

Even after the sleeve face 32 is seated, the plunger rod 19 and its head 20 can continue leftward movement to the end of its available stroke, further compressing retraction spring 31. The stroke and dimensions of plunger rod 19 are selected, however, so that when plunger rod 19 is displaced for the maximum available distance, the poppet sleeve 25 is still yieldingly engaged with the plunger and adapted for some further limited movement relative to the plunger away from the orifice 27. The solenoid remains energized throughout the period the valve is energized.

As soon as a predetermined pressure develops in the casing between inlet port 13 and outlet port 15 while the valve is energized, the resulting pressure force acts upon the face 32 of sleeve 25 to displace the sleeve 25 rightward, unseating it from orifice 27 and further compressing spring 29. Thereafter, the sleeve 25 automatically modulates the system pressure at the predetermined level which caused the sleeve 25 to open.

When the solenoid 23 is de-energized, the plunger retraction spring 31 expands to retract the plunger head 20 and plunger rod 19 rightward. Simultaneously, spring 29 expands to reset the poppet sleeve 25 on rod 19 to the position shown in the drawing.

Variations of the construction discussed may be made within the scope of the appended claims.

We claim:

1. A valve comprising a casing with inlet, outlet, main exhaust and auxiliary exhaust ports; a plunger reciprocative in the casing providing three-way directional control action between said ports; means for biasing said plunger to a position in which said inlet port is normally in communication with said main exhaust port, and said outlet port is in communication with said auxiliary exhaust port; a motor for displacing said plunger to a position to communicate said inlet port and said outlet port and to block communication between both the latter said ports and both said exhaust ports; and said plunger including a sleeve movable with the plunger for directional control of said fluid between said inlet, outlet and main exhaust port, and means for yieldingly connecting said sleeve to said plunger for movement of said sleeve relative to the plunger, whereby said sleeve is adapted, to modulate the pressure of said medium by selectively recommunicating said inlet and main exhaust port in response to a predetermined pressure of said medium.

2. A valve according to claim 1 wherein said plunger further includes a plunger head in the casing for directing flow of a fluid pressure medium between said outlet port and said auxiliary exhaust port, and a plunger rod extending from said head and operationally engageable with said displacing motor so that the plunger rod and head are moved axially by said displacing motor; a sleeve being slidably mounted on said rod, wherein said yielding connection is a spring biasing said sleeve to a preselected position on said rod, said sleeve being movable with said rod to a position to close said main exhaust from said other ports, and said sleeve being movable relative to said rod against the resistance of said spring to open said exhaust port in response to a preselected pressure in the casing acting on said sleeve.

References Cited

UNITED STATES PATENTS

| | | | |
|---|---|---|---|
| 2,658,523 | 11/1953 | Johnson | 137—629 |
| 2,983,286 | 5/1961 | Greenawalt | 137—628 X |
| 3,016,920 | 1/1962 | Thomsen | 137—625.65 |
| 3,030,981 | 4/1962 | Chatham | 137—628 |

CLARENCE R. GORDON, *Primary Examiner.*